(12) United States Patent
Fujiwara (10) Patent No.: US 9,925,947 B2
(45) Date of Patent: Mar. 27, 2018

(54) REAR SEAT SIDE-AIRBAG DEVICE (71) Applicant: Toyota Jidosha Kabushiki Kaisha, Toyota-shi Aichi-ken (JP)

(72) Inventor: Yusuke Fujiwara, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/196,815

(22) Filed: Jun. 29, 2016

(65) Prior Publication Data
US 2017/0066402 A1  Mar. 9, 2017

(30) Foreign Application Priority Data

Sep. 4, 2015  (JP) .................................. 2015-174906

(51) Int. Cl.
*B60R 21/231*  (2011.01)
*B60R 21/207*  (2006.01)
*B60R 21/215*  (2011.01)

(52) U.S. Cl.
CPC .......... *B60R 21/231* (2013.01); *B60R 21/207* (2013.01); *B60R 21/215* (2013.01); *B60R 2021/2078* (2013.01); *B60R 2021/23153* (2013.01)

(58) Field of Classification Search
CPC combination set(s) only.
See application file for complete search history.

(56) References Cited

U.S. PATENT DOCUMENTS

| 8,534,701 B2* | 9/2013 | Sosnowski | B60R 21/20 180/65.21 |
| 8,596,674 B2* | 12/2013 | Fukawatase | B60R 21/207 280/728.2 |
| 8,651,518 B2* | 2/2014 | Shamoto | B60N 2/289 280/730.2 |
| 9,085,279 B2* | 7/2015 | Fukawatase | B60R 21/207 |
| 9,446,733 B2* | 9/2016 | Pausch | B60R 21/231 |
| 9,630,584 B2* | 4/2017 | Fujiwara | B60R 21/207 |
| 2006/0061073 A1* | 3/2006 | Naruse | B60R 21/21 280/730.2 |
| 2006/0138754 A1* | 6/2006 | Hirata | B60R 21/0132 280/730.1 |
| 2007/0182131 A1* | 8/2007 | Helbig | B60R 21/2165 280/728.2 |

(Continued)

FOREIGN PATENT DOCUMENTS

| FR | 2830802 A1 * | 4/2003 | B60R 21/207 |
| JP | 08040176 A * | 2/1996 | B60R 21/21 |

(Continued)

*Primary Examiner* — Nicole T Verley
(74) *Attorney, Agent, or Firm* — Dinsmore & Shohl LLP (57) ABSTRACT

A rear seat side-airbag device of the technology of the present disclosure includes: a side airbag that is disposed between a side garnish and a body, the side garnish being disposed at a vehicle width direction outer-side of a seat back of a rear seat, the side airbag becoming deployed on the side of an occupant; and an airbag door garnish that covers the side airbag from a cabin side and is disposed at a position where at least part of a boundary section between the airbag door garnish and the side garnish is covered from the cabin side by webbing in an unworn state.

18 Claims, 8 Drawing Sheets

(56) References Cited

U.S. PATENT DOCUMENTS

| | | | | |
|---|---|---|---|---|
| 2009/0039623 A1* | 2/2009 | Kawabe | ............... | B60R 21/207 280/728.3 |
| 2009/0108571 A1* | 4/2009 | Sato | ................ | B60R 21/207 280/730.2 |
| 2012/0133114 A1* | 5/2012 | Choi | ................ | B60R 21/214 280/728.2 |
| 2012/0200070 A1* | 8/2012 | Baccelli | ................ | B60R 21/20 280/730.2 |
| 2013/0175792 A1* | 7/2013 | Fukawatase | ........... | B60N 2/289 280/728.2 |
| 2013/0200599 A1* | 8/2013 | Shamoto | ................ | B60N 2/289 280/730.2 |
| 2016/0068129 A1* | 3/2016 | Tanabe | ................ | B60N 2/449 280/728.3 |
| 2016/0107598 A1* | 4/2016 | Fischer | ................ | B60R 21/231 280/729 |
| 2016/0176377 A1* | 6/2016 | Jenny | ................ | B60R 21/213 280/730.2 |

FOREIGN PATENT DOCUMENTS

| | | |
|---|---|---|
| JP | 2006-088774 A | 4/2006 |
| JP | 2006-088850 A | 4/2006 |
| JP | 2009-040326 A | 2/2009 |
| JP | 2009-040328 A | 2/2009 |
| JP | 2009-143379 A | 7/2009 |
| JP | 2010-247800 A | 11/2010 |
| JP | 2014-210544 A | 11/2014 |
| JP | 2015009623 A * | 1/2015 ........... B60R 21/207 |

* cited by examiner

REAR SEAT SIDE-AIRBAG DEVICE

CROSS-REFERENCE TO RELATED APPLICATION

This application claims priority under 35 USC 119 from Japanese Patent Application No. 2015-174906 filed on Sep. 4, 2015, the disclosure of which is incorporated by reference herein.

BACKGROUND

Technical Field

The technology of the present disclosure relates to a rear seat side-airbag device.

Related Art

Japanese Patent Application Laid-open (JP-A) No. 2010-247800 discloses a structure where a rear seat side-airbag device equipped with a side airbag and an airbag door (airbag door garnish) that covers the side airbag from a cabin side is disposed between a side portion of a seat back of a rear seat and a body.

However, in the case of attaching the airbag door garnish disclosed in JP-A No. 2010-247800 to an interior part such as a side garnish, the boundary section between the airbag door garnish and the side garnish can be seen from the cabin side. For this reason, there is room for improvement from the standpoint of improving the visual attractiveness of the rear seat.

SUMMARY

An object of an embodiment of the present disclosure provides a rear seat side-airbag device that can improve the visual attractiveness of a rear seat in a structure where an airbag door garnish is attached to a side garnish.

A rear seat side-airbag device of a first aspect of the present disclosure includes: a side airbag that is disposed between a side garnish and a body, the side garnish being disposed at a vehicle width direction outer-side of a seat back of a rear seat, the side airbag becoming deployed on a side of an occupant; and an airbag door garnish that covers the side airbag from a cabin side and is disposed at a position where at least part of a boundary section between the airbag door garnish and the side garnish is covered from the cabin side by webbing in an unworn state.

In the first aspect, the side airbag is disposed between the side garnish and the body, and the side airbag becomes deployed on the side of the occupant sitting in the rear seat. Furthermore, the side airbag is covered from the cabin side by the airbag door garnish. Here, the airbag door garnish is disposed at a position where at least part of the boundary section between the side garnish and the airbag door garnish is covered from the cabin side by the webbing in an unworn state. Because of this, a sense of unity between the side garnish and the airbag door garnish is obtained, and the visual attractiveness of the rear seat can be improved. Thus, the first aspect has the superior effect that it can improve the visual attractiveness of the rear seat in a structure where an airbag door garnish is attached to a side garnish.

A rear seat side-airbag device of a second aspect of the present disclosure is the first aspect, wherein the boundary section includes a vertical boundary portion that extends in a vehicle upward and downward direction, and an entire area of the vertical boundary portion is covered from the cabin side by the webbing in an unworn state.

In the second aspect, the entire area of the vertical boundary portion is covered from the cabin side by the webbing in an unworn state, so the visual attractiveness of the rear seat can be improved compared to a structure where part of the vertical boundary portion is exposed to the cabin side. Thus, the second aspect has the superior effect that it can improve the visual attractiveness of the rear seat compared to a structure where part of the vertical boundary portion is exposed or a structure where a horizontal boundary portion and an arm rest do not coincide with each other as seen in a vehicle front view.

A rear seat side-airbag device of a third aspect of the present disclosure is the second aspect, wherein the boundary section includes a horizontal boundary portion that extends outward in the vehicle width direction from a lower end portion of the vertical boundary portion, and at least part of the horizontal boundary portion overlaps with an arm rest of a rear side door as seen in a vehicle front view.

In the third aspect, at least part of the horizontal boundary portion overlaps with the arm rest as seen in a vehicle front view. Because of this, when the rear seat is seen from the front seat side, for example, the horizontal boundary portion can be made unable to be seen or difficult to be seen, and the visual attractiveness of the rear seat can be improved even in a case where the boundary section includes the horizontal boundary portion. Thus, the third aspect has the superior effect that it can improve the visual attractiveness of the rear seat compared to a structure where part of the boundary section is exposed to the cabin side.

A rear seat side-airbag device of a fourth aspect of the present disclosure is the first aspect, further including an inside guide portion that bulges out toward the cabin side from the side garnish and limits movement, inward in the vehicle width direction, of the webbing in an unworn state.

In the fourth aspect, movement, inward in the vehicle width direction, of the webbing in an unworn state can be limited by the inside guide portion even when the vehicle is traveling. Thus, the fourth aspect has the superior effect that it can well maintain the visual attractiveness of the rear seat even when the vehicle is traveling.

A rear seat side-airbag device of a fifth aspect of the present disclosure is the first aspect, further including an outside guide portion that bulges out toward the cabin side from the airbag door garnish and limits movement, outward in the vehicle width direction, of the webbing in an unworn state.

In the fifth aspect, movement, outward in the vehicle width direction, of the webbing in an unworn state can be limited by the outside guide portion even when the vehicle is traveling. Particularly in a structure equipped with the outside guide portion and the inside guide portion, the position of the webbing in an unworn state can be kept in a fixed range, and exposure of the boundary section between the side garnish and the airbag door garnish can be effectively avoided or controlled. Thus, the fifth aspect has the superior effect that it can well maintain the visual attractiveness of the rear seat even when the vehicle is traveling.

BRIEF DESCRIPTION OF THE DRAWINGS

Exemplary embodiments of the present disclosure will be described in detail based on the following figures, wherein.

DETAILED DESCRIPTION

First Embodiment

A rear seat side-airbag device 10 pertaining to a first embodiment will be described with reference to FIG. 1 and FIG. 2. It should be noted that arrow FR appropriately shown in these drawings indicates a vehicle forward direction, arrow UP indicates a vehicle upward direction, and arrow RH indicates a vehicle rightward direction when facing the traveling direction. Furthermore, when the directions of front and rear, up and down, and right and left are used without further special mention in the following description, these will be understood to mean front and rear in the vehicle forward and rearward direction, up and down in the vehicle upward and downward direction, and right and left when facing the traveling direction.

Figure 1:
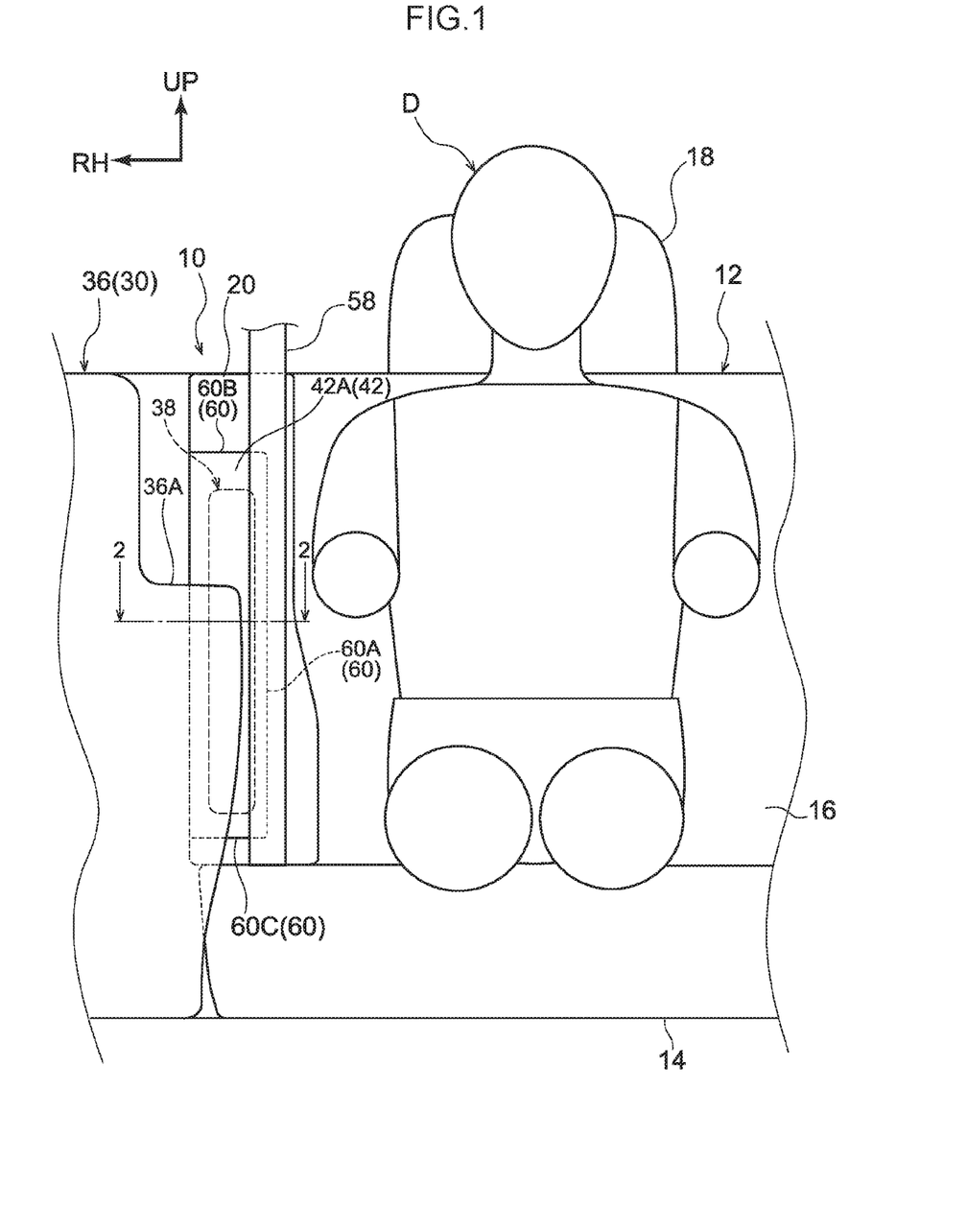
FIG. 1 is a front view showing a rear seat to which a rear seat side-airbag device pertaining to a first embodiment has been applied.

FIG. 1 is a front view showing, as seen from the vehicle front side, a rear seat 12 to which the rear seat side-airbag device 10 pertaining to the present embodiment has been applied. Furthermore, FIG. 1 shows a state in which a collision test dummy, serving as a model of an occupant to be protected, is sitting on a seat cushion 14 of the rear seat 12. The dummy is, for example, World Side Impact Dummy (WorldSID) AM50 (representing a 50th percentile American adult male). The dummy is sitting in a standard sitting posture determined by collision test procedures, and the rear seat 12 is positioned in a standard set position corresponding to the sitting posture. Below, in order to facilitate understanding of the description, the dummy is called an "occupant D".

As shown in FIG. 1, the rear seat 12 is configured to include the seat cushion 14 and a seat back 16. A head rest 18 for supporting the head of the occupant D is disposed on the upper end portion of the seat back 16. Furthermore, webbing (a belt) 58 for restraining the occupant D is disposed on the side of the occupant D. The webbing 58 extends in the vehicle upward and downward direction, and one end portion of the webbing 58 is secured to a belt anchor (not shown in the drawings) attached to a vehicle floor. The other end portion of the webbing 58 is taken up on a retractor (not shown in the drawings) installed on an upper back panel.

Here, a side garnish 20 is disposed on both vehicle width direction sides which are examples of a vehicle width direction outer-side according to the technology of the present disclosure, of the seat back 16 of the rear seat 12, and the rear seat side-airbag device 10 is attached to the side garnish 20. It should be noted that, although FIG. 1 shows only the side garnish 20 and the rear seat side-airbag device 10 on the vehicle right side of the seat back 16, the side garnish 20 and the rear seat side-airbag device 10 are also likewise disposed on the vehicle left side of the seat back 16. Furthermore, the rear seat side-airbag device 10 on the vehicle right side and the rear seat side-airbag device 10 on the vehicle left side are bilaterally symmetrical, so in the following description only the rear seat side-airbag device 10 on the vehicle right side is described.

Figure 2:
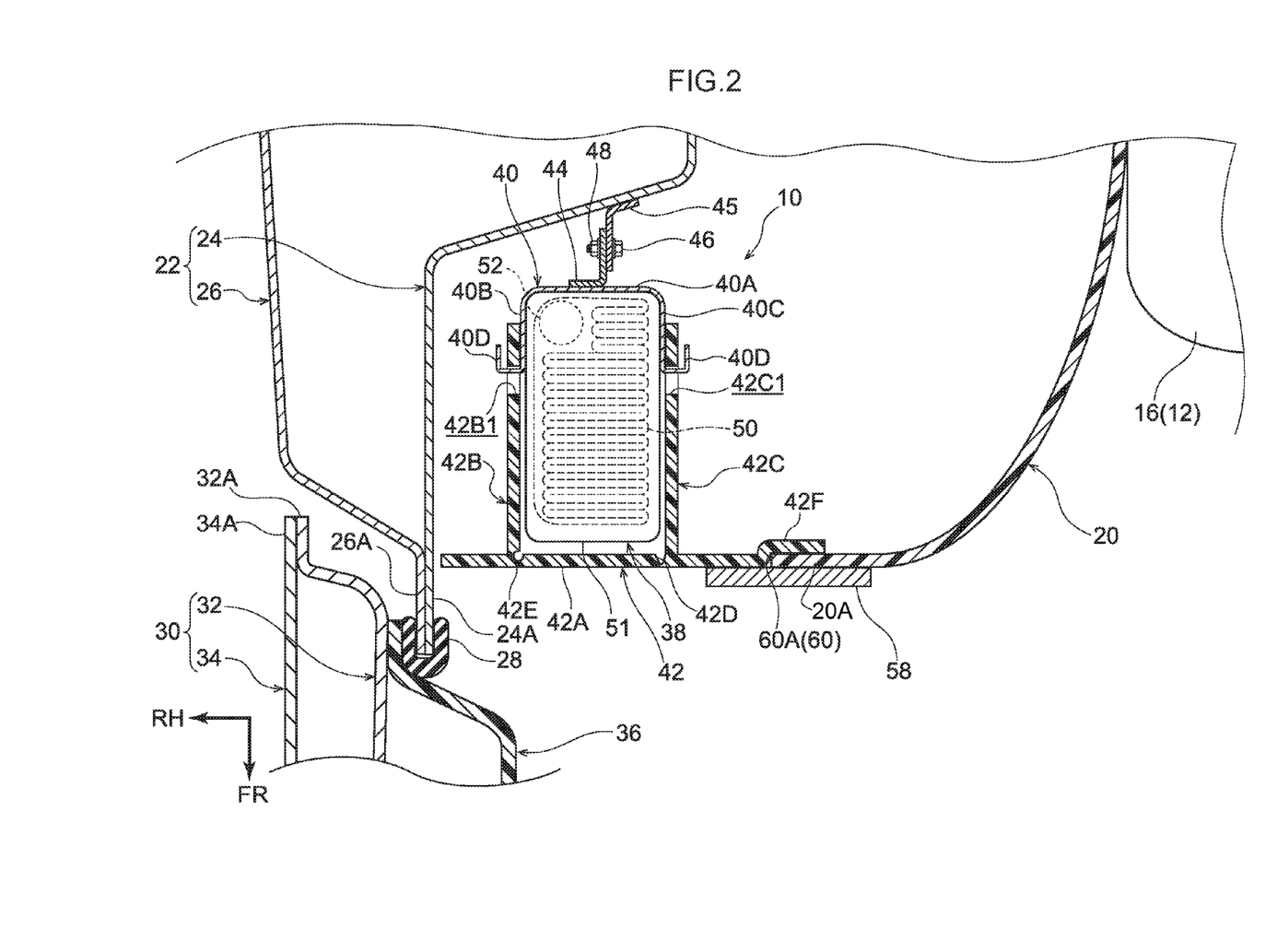
FIG. 2 is an enlarged cross-sectional view cut along line 2-2 of FIG. 1.

As shown in FIG. 2, the side garnish 20 is disposed between the seat back 16 and a wheel well 22, which is an example of a body according to the technology of the present disclosure, and the side garnish 20 is made of resin. Furthermore, the rear seat side-airbag device 10 is attached to the vehicle right side (vehicle width direction outer-side) end portion of the side garnish 20. The rear seat side-airbag device 10 will be described later.

The wheel well 22 is configured to include a wheel well inner panel 24 that configures an inner panel and a wheel well outer panel 26 that configures an outer panel. Furthermore, the wheel well inner panel 24 extends in the vehicle forward and rearward direction along the side portion on the vehicle right side of the rear seat side-airbag device 10 and bulges out in the vehicle leftward direction (inward in the vehicle width direction) on the vehicle rear side of the rear seat side-airbag device 10. Furthermore, an inner-side flange 24A is formed on the front end portion of the wheel well inner panel 24.

The wheel well outer panel 26 extends in the vehicle forward and rearward direction on the vehicle right side of the wheel well inner panel 24 and configures a closed cross section between itself and the wheel well inner panel 24. Furthermore, an outer-side flange 26A is formed along the inner-side flange 24A on the front end portion of the wheel well outer panel 26. Additionally, the inner-side flange 24A and the outer-side flange 26A are joined to each other to configure a rear edge of a door opening. Furthermore, a weather strip 28 is attached to the joint section of the inner-side flange 24A and the outer-side flange 26A.

A rear side door 30 is disposed at the vehicle front side of the wheel well 22. The rear side door 30 is configured to include a door inner panel 32 that configures an inner panel and a door outer panel 34 that configures an outer panel. Additionally, an inner-side flange 32A formed on the peripheral edge of the door inner panel 32 and an outer-side flange 34A formed on the peripheral edge of the door outer panel 34 are joined to each other. Furthermore, a door trim 36 made of resin that is an interior part is attached to the vehicle left side of the door inner panel 32.

The rear seat side-airbag device 10 attached to the side garnish 20 is configured to include an airbag module 38, a case 40, and an airbag door garnish 42 (hereinafter appropriately called "the airbag door 42"). Furthermore, the airbag module 38 is configured to include a side airbag 50, which becomes inflated and deployed on the side of the occupant D, and an inflator 52, which is for supplying gas to the side airbag 50. The airbag module 38 is housed in the case 40.

The case 40 housing the airbag module 38 is formed in the shape of a box whose vehicle front side is open. The case 40 includes a bottom wall 40A, a side wall 40B, and a side wall 40C, so that the cross-sectional shape of the case 40 as seen from the vehicle upper side is a substantially U-shape that opens in the vehicle forward direction. Furthermore, the bottom wall 40A extends in the vehicle width direction as seen in a vehicle plan view.

The side wall 40B and the side wall 40C extend in the vehicle forward direction from both vehicle width direction end portions of the bottom wall 40A and are spaced apart from and oppose each other in the vehicle width direction. Furthermore, anchoring claws 40D are formed on the side wall 40B and the side wall 40C. One of the anchoring claws 40D extends outward from a front end edge of the side wall 40B and the other of the anchoring claws 40D extends outward from a front end edge of the side wall 40C. And each of the anchoring claws 40D is bent in the vehicle rearward direction. For this reason, the anchoring claws 40D are each formed in a substantially L-shape as seen in a vehicle plan view.

Here, the case 40 is attached to the airbag door 42 as a result of the anchoring claws 40D being anchored to the airbag door 42. Furthermore, an L-shaped bracket 44 is joined to the vehicle rear side surface of the bottom wall 40A of the case 40. An L-shaped bracket 45 is also joined to the wheel well inner panel 24, and the L-shaped bracket 44 on the case 40 and the L-shaped bracket 45 on the wheel well inner panel 24 are fastened to each other via a bolt 46 and a nut 48. Because of this, the case 40 is secured to the wheel well 22.

The airbag module 38 is housed in the case 40. The airbag module 38 is placed in a space between the case 40 and the airbag door 42, and the front end portion of the airbag module 38 projects in the vehicle forward direction from the opening of the case 40. Furthermore, the airbag module 38 is equipped with the side airbag 50 that becomes bag-shaped. The side airbag 50 is wrapped in a wrap 51, which is easily ruptured, in a state in which the side airbag 50 is folded in a serpentine shape as an example. It should be noted that the side airbag 50 is not limited to being folded in a serpentine shape and may also be folded in another way. For example, the side airbag 50 may also be folded in a roll shape. Furthermore, the side airbag 50 may also be housed without being folded.

The inflator 52 is, together with the side airbag 50, wrapped in the wrap 51. A combustible or cold gas inflator is employed as the inflator 52. The inflator 52 supplies gas generated upon actuation to the side airbag 50. In the present embodiment, the inflator 52 comprises a cylinder inflator and is placed in such a way that its lengthwise direction lies along the vehicle upward and downward direction. Furthermore, the inflator 52 is electrically connected to an electronic control unit (ECU) (not shown in the drawings) that is a control unit, and the inflator 52 is actuated by the ECU at the time of a vehicle collision.

Moreover, a stud bolt (not shown in the drawings) is disposed projecting from the inflator 52, and the inflator 52 is fastened via the stud bolt to the side wall 40B or the bottom wall 40A of the case 40.

The airbag door 42 is disposed at the cabin side of the airbag module 38, and the airbag module 38 is covered from the cabin side by the airbag door 42. Furthermore, as shown in FIG. 1, the airbag door 42 is positioned between the upper end portion and the lower end portion of the side garnish 20.

As shown in FIG. 2, as seen in a vehicle plan sectional view, the airbag door 42 is configured to include a horizontal wall portion 42A, which extends in the vehicle width direction, and a vertical wall portion 42B and a vertical wall portion 42C, which extend in the vehicle rearward direction from the horizontal wall portion 42A. Furthermore, the horizontal wall portion 42A extends in the vehicle width direction between the side garnish 20 and the wheel well inner panel 24. Moreover, the horizontal wall portion 42A is formed in a substantially rectangular shape whose lengthwise direction lies along the vehicle upward and downward direction as seen in a vehicle front view (see FIG. 1).

The vertical wall portion 42B and the vertical wall portion 42C are placed opposing each other in the vehicle width direction. The vertical wall portion 42B extends in the vehicle rearward direction from the vehicle right side of the vehicle width direction central section of the horizontal wall portion 42A. The vertical wall portion 42C extends in the vehicle rearward direction from the vehicle left side of the vehicle width direction central section of the horizontal wall portion 42A.

Here, an anchoring hole 42B1 is formed in the vertical wall portion 42B, and the anchoring claw 40D formed on the side wall 40B of the case 40 is anchored in the anchoring hole 42B1. Furthermore, an anchoring hole 42C1 is formed in the vertical wall portion 42C, and the anchoring claw 40D formed on the side wall 40C of the case 40 is anchored in the anchoring hole 42C1.

Furthermore, a thin-walled tear portion 42D is formed in the horizontal wall portion 42A at the base section of the vertical wall portion 42C. The tear portion 42D is a prescribed rupture portion that becomes ruptured by the inflation pressure of the side airbag 50 described later. Moreover, a thin-walled hinge portion 42E is formed in the horizontal wall portion 42A at the base section of the vertical wall portion 42B. The hinge portion 42E is formed thicker than the tear portion 42D. Additionally, as a result of the tear portion 42D being ruptured when the side airbag 50 becomes inflated and deployed, the hinge portion 42E serves as a hinge so that the section of the horizontal wall portion 42A between the tear portion 42D and the hinge portion 42E opens in the vehicle forward direction around the hinge portion 42E.

Furthermore, claw portions 42F extend in the vehicle leftward direction from the vehicle left side end portion of the horizontal wall portion 42A. The claw portions 42F are formed, with a step between them, on the vehicle rear side of the horizontal wall portion 42A, and the claw portions 42F are anchored to the vehicle rear side surface (back surface) of the side garnish 20. Furthermore, a plurality of the claw portions 42F are formed along the peripheral edge of the airbag door 42, and the airbag door 42 is attached to the side garnish 20 as a result of the plural claw portions 42F being anchored to the back surface of the side garnish 20. Furthermore, in a state in which the airbag door 42 is attached to the side garnish 20, the horizontal wall portion 42A and a vehicle right side outer end portion 20A of the side garnish 20 form the same surface.

Here, as shown in FIG. 1, a boundary section 60 exists between the side garnish 20 and the horizontal wall portion 42A of the airbag door 42 as seen in a vehicle front view. Additionally, the boundary section 60 includes a vertical boundary portion 60A that extends in the vehicle upward and downward direction, a horizontal boundary portion 60B that extends in the vehicle rightward direction from the upper end portion of the vertical boundary portion 60A, and a horizontal boundary portion 60C that extends in the vehicle rightward direction from the lower end portion of the vertical boundary portion 60A.

Furthermore, at least part of the boundary section 60 is covered from the cabin side by the webbing 58 in an unworn state. In the present embodiment, as an example, the entire area of the vertical boundary portion 60A is covered from the cabin side by the webbing 58 in an unworn state. That is, in a case where the webbing 58 is in its position in an unworn state, the vertical boundary portion 60A is completely covered and cannot be seen as seen in a vehicle front view.

Moreover, in the present embodiment, the airbag door 42 is positioned in such a way that part of the horizontal boundary portion 60C overlaps with an arm rest 36A as seen in a vehicle front view. Specifically, the vehicle right side of the horizontal boundary portion 60C coincides with the arm rest 36A as seen in a vehicle front view.

(Action and Effects)

Next, the action and effects of the rear seat side-airbag device 10 pertaining to the present embodiment will be described.

In the present embodiment, the airbag door 42 is placed in a position where at least part of the boundary section 60 between the side garnish 20 and the airbag door 42 is covered from the cabin side by the webbing 58 in an unworn state. Because of this, a sense of unity between the side garnish 20 and the airbag door 42 is obtained, and the visual attractiveness of the rear seat 12 can be improved.

Furthermore, in the present embodiment, the entire area of the vertical boundary portion 60A of the boundary section 60 is covered from the cabin side by the webbing 58 in an unworn state, so the visual attractiveness of the rear seat 12 can be improved, compared to a structure where part of the vertical boundary portion 60A is exposed.

Moreover, in the present embodiment, the airbag door 42 is positioned in such a way that at least part of the horizontal boundary portion 60C overlaps with the arm rest 36A as seen in a vehicle front view, so the visual attractiveness of the rear seat 12 when the rear seat 12 is seen from the front seat side, for example, can be improved.

It should be noted that, although in the present embodiment the airbag door 42 is disposed between the upper end portion and the lower end portion of the side garnish 20, the position of the airbag door 42 is not limited to this. For example, the rear seat side-airbag device according to technology disclosed herein may also be given structures described in a first example modification, a second example modification, and a third example modification below.

First Example Modification

Figure 3:
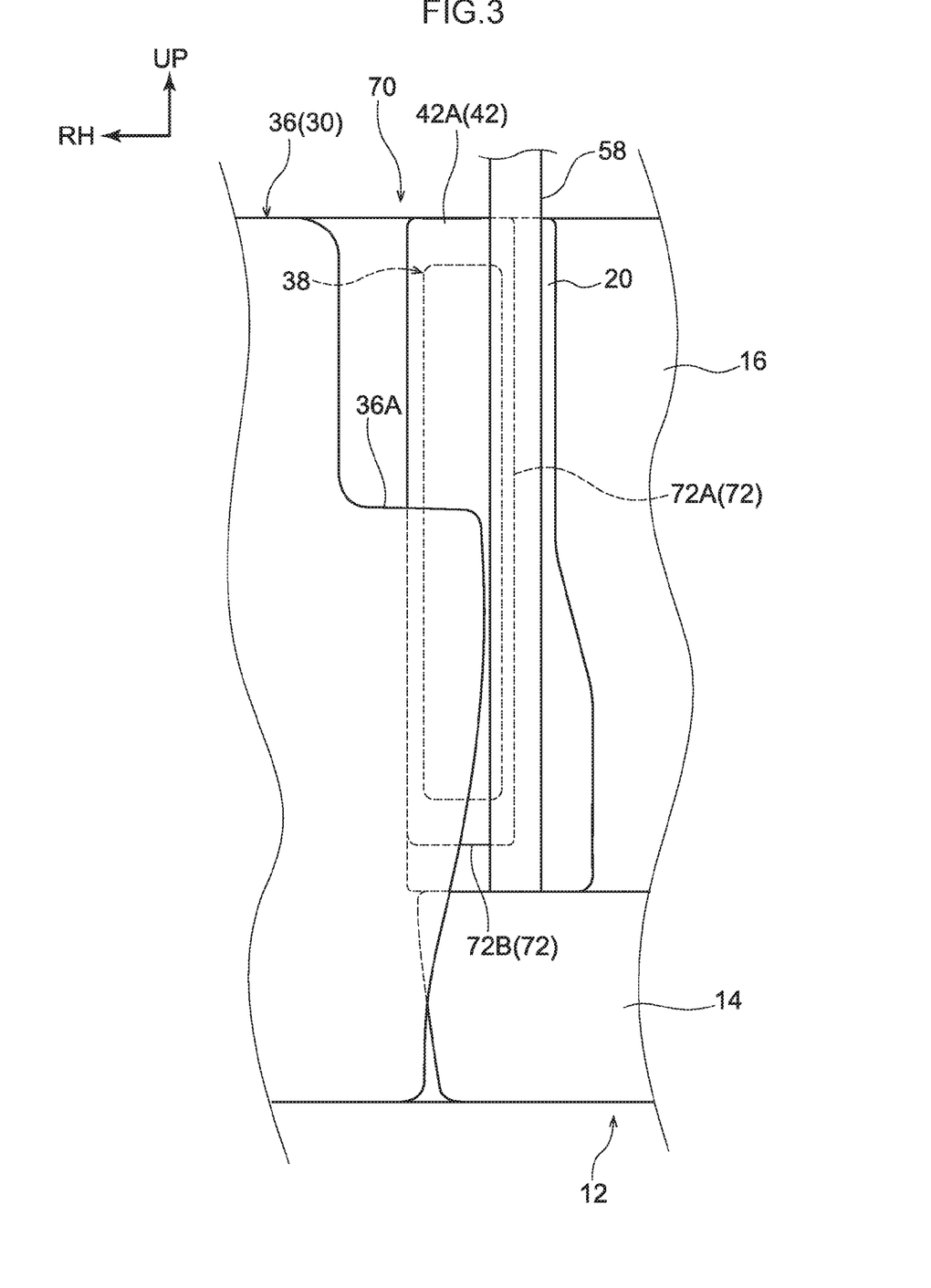
FIG. 3 is a front view, with relevant sections enlarged, showing a first example modification of a rear seat side-airbag device pertaining to the first embodiment.

As shown in FIG. 3, in a rear seat side-airbag device 70 pertaining to the first example modification, the upper end portion of the airbag door 42 is positioned at the same height as the upper end portion of the side garnish 20. Furthermore, the lower end portion of the airbag door 42 is positioned on the vehicle upper side of the lower end portion of the side garnish 20, and the airbag door 42 is attached to the side garnish 20 by plural claw portions (not shown in the drawing) formed on the peripheral edge of the airbag door 42. For this reason, a boundary section 72 between the side garnish 20 and the airbag door 42 includes a vertical boundary portion 72A, which extends in the vehicle upward and downward direction from the upper end portion to the lower end portion of the airbag door 42, and a horizontal boundary portion 72B, which extends in the vehicle rightward direction from the lower end portion of the vertical boundary portion 72A. For this reason, the boundary section 72 lacks an upper-side horizontal boundary portion like the upper-side horizontal boundary portion 60B in FIG. 1.

The entire area of the vertical boundary portion 72A is covered from the cabin side by the webbing 58. That is, in a case where the webbing 58 is in its position in an unworn state, the vertical boundary portion 72A is completely covered and cannot be seen as seen in a vehicle front view. Furthermore, part of the horizontal boundary portion 72B overlaps with the arm rest 36A as seen in a vehicle front view.

In the structure of this example modification, compared to the structure in FIG. 1, the visual attractiveness of the rear seat 12 can be improved in correspondence to the lack of the upper-side horizontal boundary portion 60B.

Second Example Modification

Figure 4:
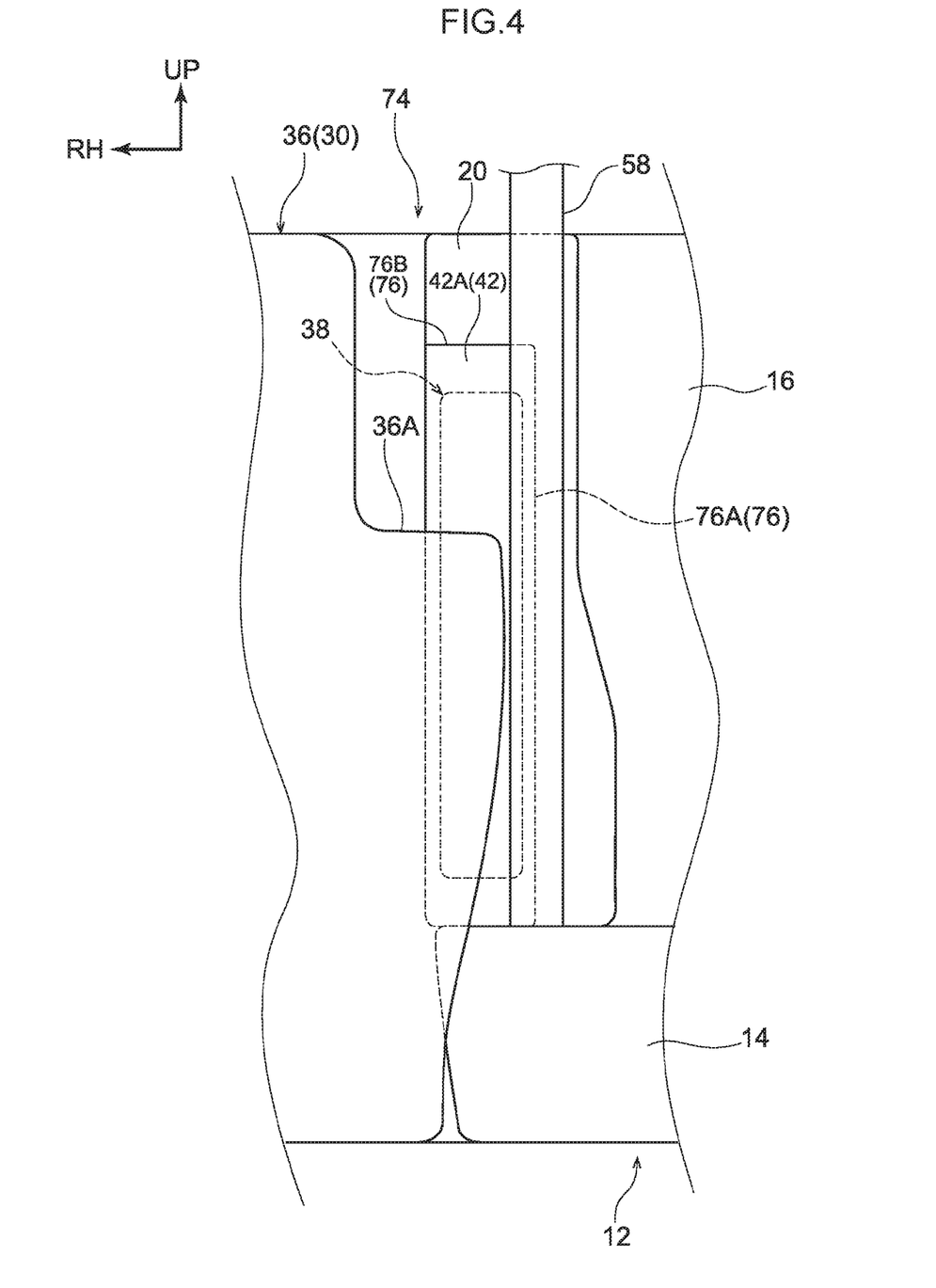
FIG. 4 is a front view, with relevant sections enlarged, showing a second example modification of a rear seat side-airbag device pertaining to the first embodiment.

As shown in FIG. 4, in a rear seat side-airbag device 74 pertaining to the second example modification, the lower end portion of the airbag door 42 is positioned at the same height as the lower end portion of the side garnish 20. Furthermore, the upper end portion of the airbag door 42 is positioned on the vehicle lower side of the upper end portion of the side garnish 20, and the airbag door 42 is attached to the side garnish 20 by plural claws (not shown in the drawing) formed on the peripheral edge of the airbag door 42. For this reason, a boundary section 76 between the side garnish 20 and the airbag door 42 includes a vertical boundary portion 76A, which extends in the vehicle upward and downward direction from the upper end portion to the lower end portion of the airbag door 42, and a horizontal boundary portion 76B, which extends in the vehicle rightward direction from the upper end portion of the vertical boundary portion 76A. For this reason, the boundary section 76 lacks a lower-side horizontal boundary portion like the lower-side horizontal boundary portion 60C in FIG. 1.

The entire area of the vertical boundary portion 76A is covered from the cabin side by the webbing 58. That is, in a case where the webbing 58 is in its position in an unworn state, the vertical boundary portion 76A is completely covered and cannot be seen as seen in a vehicle front view.

In the structure of this example modification, compared to the structure in FIG. 1, the airbag module 38 is disposed at the vehicle lower side in correspondence to the airbag door 42 being disposed at the vehicle lower side. Because of this, the waist region of the occupant D can be effectively protected by the side airbag 50 at the time of a vehicle collision.

Third Example Modification

Figure 5:
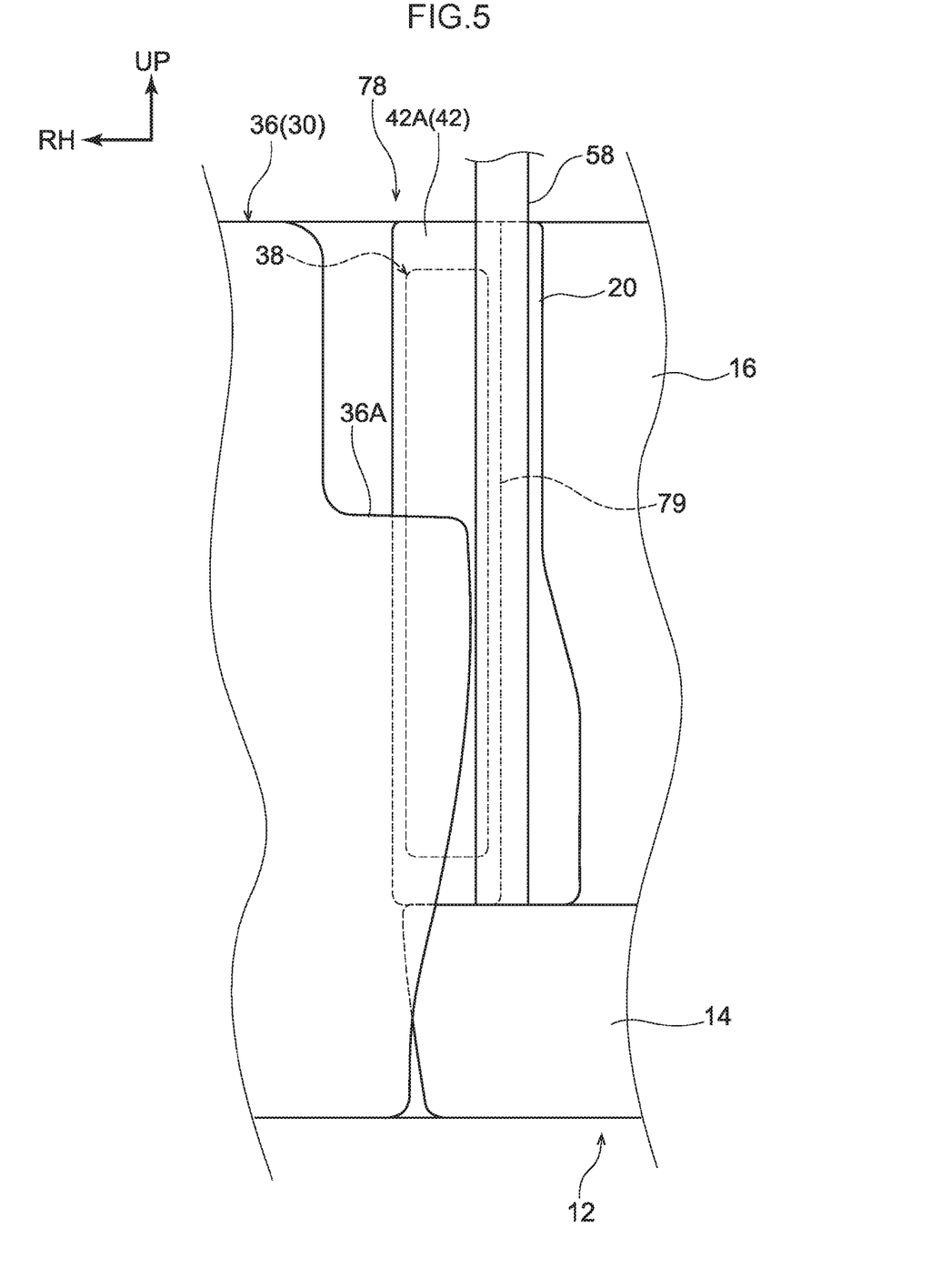
FIG. 5 is a front view, with relevant sections enlarged, showing a third example modification of a rear seat side-airbag device pertaining to the first embodiment.

As shown in FIG. 5, in a rear seat side-airbag device 78 pertaining to the third example modification, the upper end portion of the airbag door 42 is positioned at the same height as the upper end portion of the side garnish 20. Furthermore, the lower end portion of the airbag door 42 is positioned at the same height as the lower end portion of the side garnish 20. Additionally, the airbag door 42 is attached to the side garnish 20 as a result of claw portions (not shown in the drawing) formed along the vehicle left side edge of the airbag door 42 being anchored to the back surface of the side garnish 20. For this reason, a boundary section 79 between the side garnish 20 and the airbag door 42 extends in the vehicle upward and downward direction from the upper end portion to the lower end portion of the side garnish 20. Furthermore, the boundary section 79 lacks an upper-side horizontal boundary portion and a lower-side horizontal boundary portion like the upper-side horizontal boundary portion 60B and the lower-side horizontal boundary portion 60C in FIG. 1.

The entire boundary section 79 is covered from the cabin side by the webbing 58. That is, in a case where the webbing 58 is in its position in an unworn state, the boundary section 79 is completely covered and cannot be seen as seen in a vehicle front view.

In the structure of this example modification, the upper end portion and the lower end portion of the airbag door 42 are positioned at the same heights as the upper end portion and the lower end portion of the side garnish 20, so the boundary section 79 lacks horizontal boundary portions like the horizontal boundary portion 60B and the horizontal boundary portion 60C in FIG. 1. For this reason, the boundary between the side garnish 20 and the airbag door 42 consists of only the boundary section 79 extending in the vehicle upward and downward direction. Additionally, the entire area of the boundary section 79 is covered from the cabin side by the webbing 58, so the sense of unity between the side garnish 20 and the airbag door 42 can be improved. That is, the visual attractiveness of the rear seat 12 can be improved, compared to a structure where part of the boundary section between the side garnish 20 and the airbag door 42 is exposed to the cabin side.

It should be noted that, although in this example modification the rear seat side-airbag device 78 is configured in such a way that the lower end portion of the airbag device 42 is positioned at the same height as the lower end portion of the side garnish 20, the same effects can also be obtained when the lower end portion of the airbag door 42 extends as far as the vehicle lower side of the seat cushion 14. For example, even in a structure where the side garnish 20 and the airbag door 42 are formed as far as the vehicle lower side of the seat cushion 14 and a horizontal boundary portion extends in the vehicle rightward direction from the lower end portion of a vertical boundary portion, this horizontal boundary portion virtually cannot be seen from the position of the occupant D. For this reason, the visual attractiveness of the rear seat 12 remains unmarred and the same effects as in this example modification can be obtained.

Furthermore, as long as the entire area of the boundary section 79 on the vehicle upper side of the seat cushion 14 is covered from the cabin side by the webbing 58, the same effects as in this example modification can be obtained even if the boundary section 79 on the vehicle lower side of the seat cushion 14 is not covered by the webbing 58.

Second Embodiment

Next, a rear seat side-airbag device 80 pertaining to a second embodiment will be described with reference to FIG. 6 to FIG. 8. It should be noted that the same reference signs are assigned to configurations that are the same as those in the first embodiment, and description of those same configurations will be appropriately omitted.

Figure 6:
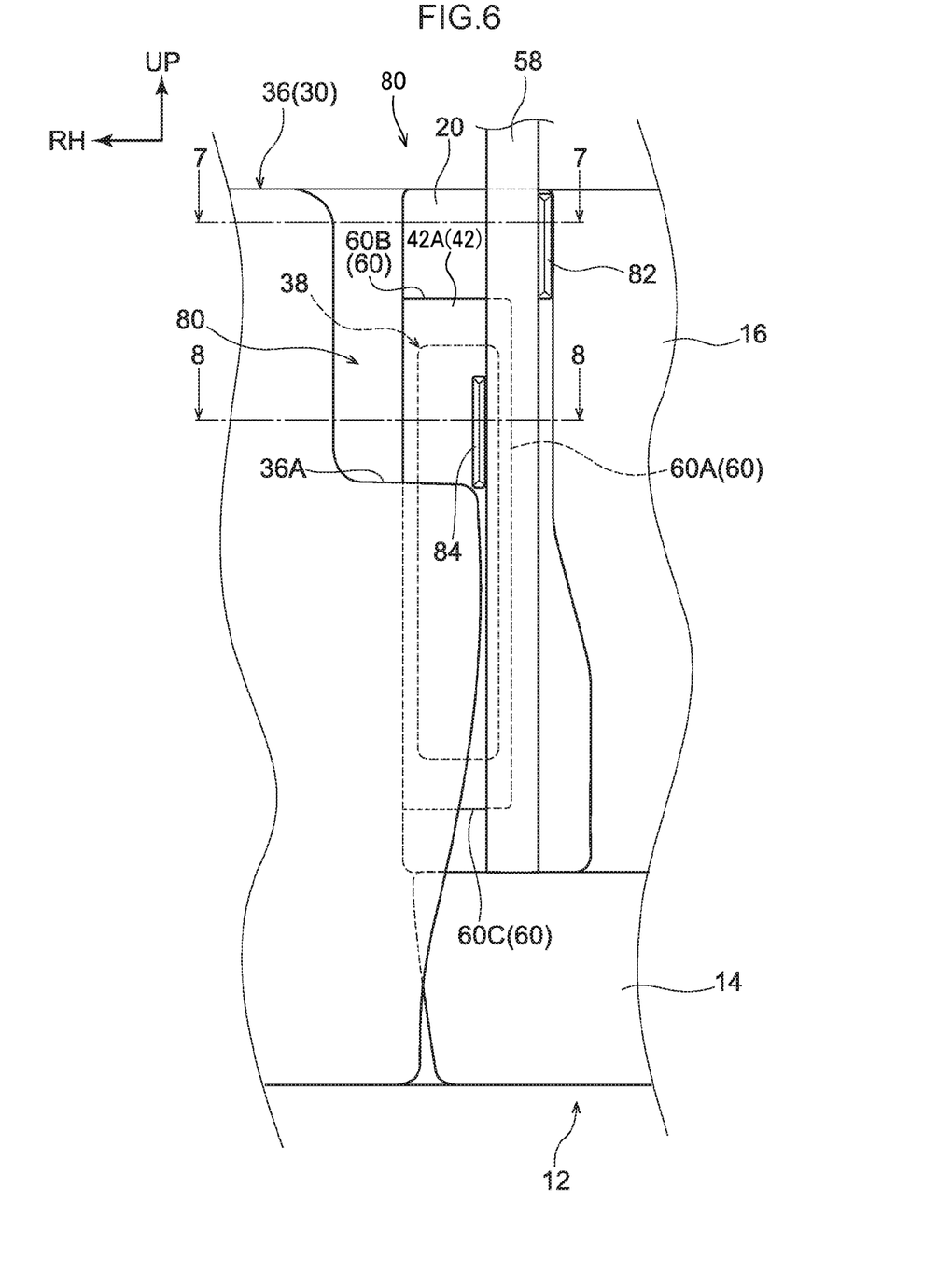
FIG. 6 is a front view, with relevant sections enlarged, showing a rear seat side-airbag device pertaining to a second embodiment.

As shown in FIG. 6, the rear seat side-airbag device 80 of the present embodiment is equipped with an inside guide portion 82 on the side garnish 20 and an outside guide portion 84 on the airbag door 42.

Figure 7:
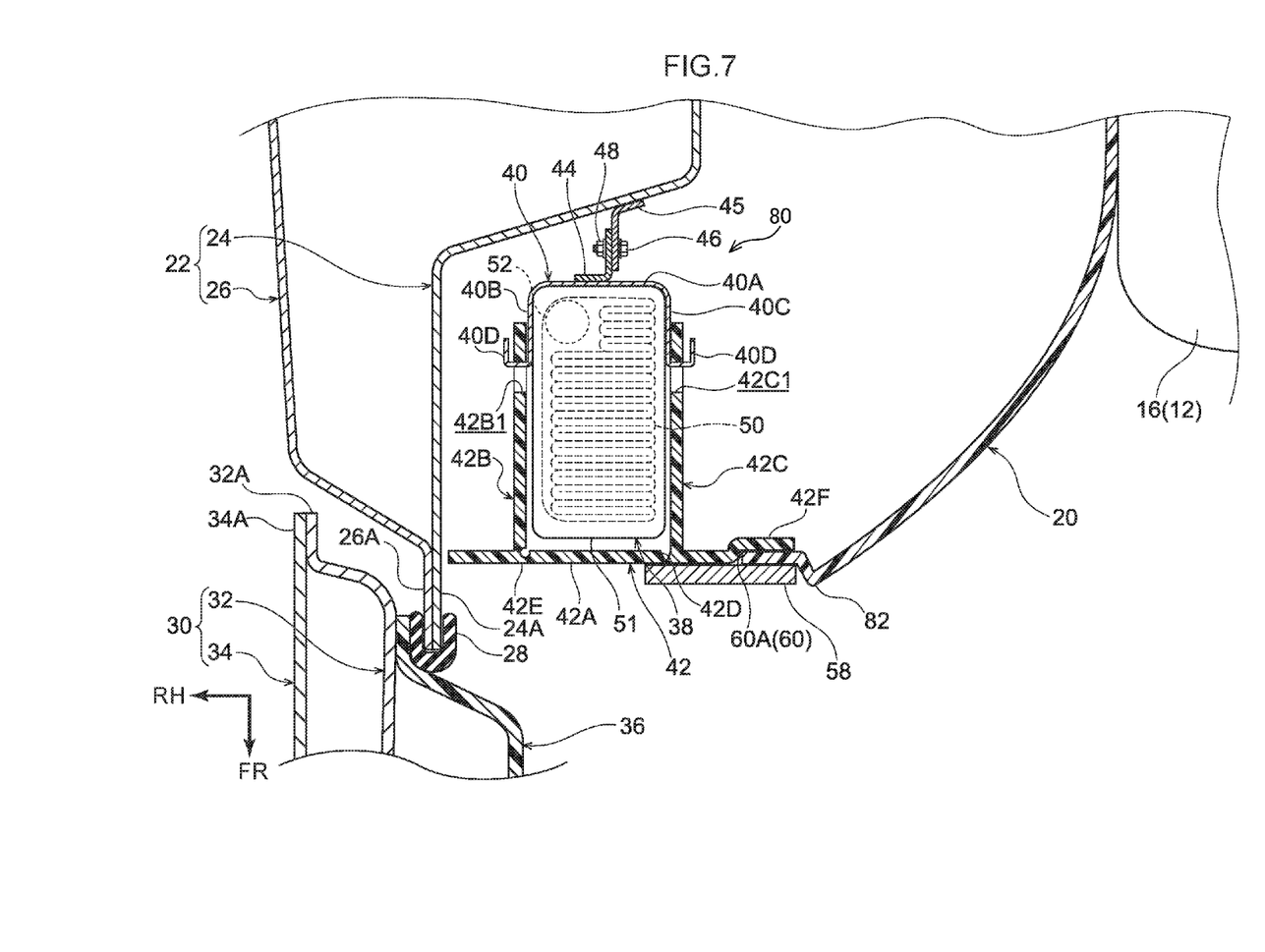
FIG. 7 is an enlarged cross-sectional view cut along line 7-7 of FIG. 6.

As shown in FIG. 7, a part of the side garnish 20 is bulged out toward the cabin side and the inside guide portion 82 is formed integrally with the side garnish 20. Specifically, the inside guide portion 82 is formed by causing a position of the side garnish 20 offset on the vehicle left side of the vertical boundary portion 60A to bulge out toward the cabin side. Furthermore, the inside guide portion 82 bulges out toward the cabin side by an amount equal to or greater than the thickness of the webbing 58 and reduces movement of the webbing 58 toward the vehicle left side of the inside guide portion 82. That is, movement of the webbing 58 in the vehicle leftward direction is limited by the inside guide portion 82.

Figure 8:
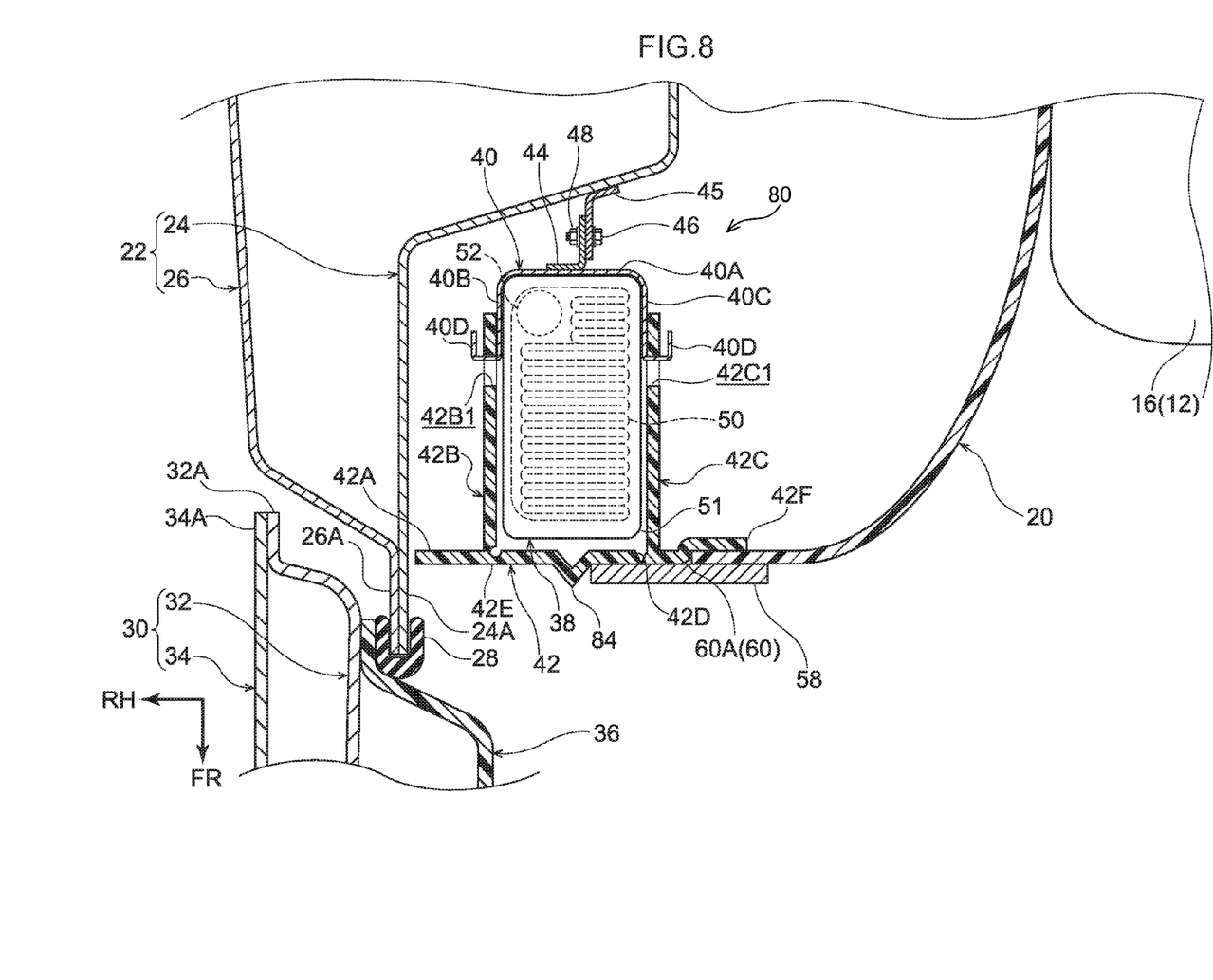
FIG. 8 is an enlarged cross-sectional view cut along line 8-8 of FIG. 6.

As shown in FIG. 8, a part of the airbag door 42 is bulged out toward the cabin side and the outside guide portion 84 is formed integrally with the airbag door 42. Specifically, the outside guide portion 84 is formed by causing a position of the airbag door 42 on the vehicle right side of the vertical boundary portion 60A to bulge out toward the cabin side. Furthermore, in the present embodiment, the outside guide portion 84 is formed between the tear portion 42D and the hinge portion 42E of the horizontal wall portion 42A. Moreover, the outside guide portion 84 bulges out toward the cabin side by an amount equal to or greater than the thickness of the webbing 58 and reduces movement of the webbing 58 toward the vehicle right side of the outside guide portion 84. That is, movement of the webbing 58 in the vehicle rightward direction is limited by the outside guide portion 84.

As shown in FIG. 6, in the present embodiment, as an example, the inside guide portion 82 extends in the vehicle upward and downward direction from the upper end portion of the side garnish 20 to a height in the neighborhood of the upper end portion of the airbag door 42. Furthermore, the outside guide portion 84 extends in the vehicle upward and downward direction from a position offset in the vehicle downward direction from the upper end portion of the airbag door 42 to a height in the neighborhood of the upper end portion of the arm rest 36A. Moreover, the distance between the inside guide portion 82 and the outside guide portion 84 is formed a little wider than the width of the webbing 58.

(Action and Effects)

Next, the action and effects of the rear seat side-airbag device 80 pertaining to the present embodiment will be described.

In the present embodiment, movement, in the vehicle width direction, of the webbing 58 in an unworn state is limited by the inside guide portion 82 and the outside guide portion 84. Because of this, the position of the webbing 58 in an unworn state can be kept in a fixed range by the inside guide portion 82 and the outside guide portion 84 even when the vehicle is traveling. As a result, exposure of the boundary section 60 (particularly the vertical boundary portion 60A) between the side garnish 20 and the airbag door 42 to the cabin side can be effectively avoided or reduced even when the vehicle is traveling. Other action is the same as in the first embodiment.

The first embodiment and the second embodiment according to the technology of the present disclosure have been described above, but the technology of the present disclosure can of course be implemented in a variety of ways without departing from the spirit of the technology of the present disclosure. For example, in the above-described embodiments and example modifications, the rear seat side-airbag device is configured in such a way that a part (the vehicle right side) of the horizontal boundary portion 60C overlaps with the arm rest 36A as seen in a vehicle front view, but the technology of the present disclosure is not limited to this. The rear seat side-airbag device may also be configured in such a way that the shape of the arm rest 36A is changed so that the entire horizontal boundary portion 60C overlaps with the arm rest 36A as seen in a vehicle front view.

Furthermore, in the above-described embodiments and example modifications, the entire area of the vertical boundary portion is covered from the cabin side by the webbing 58 in an unworn state, but the technology of the present disclosure is not limited to this. For example, the rear seat side-airbag device may also have a structure where part of the vertical boundary portion is exposed to the cabin side without being covered by the webbing 58. In this case also, the visual attractiveness of the rear seat 12 can be improved, compared to a structure where the entire area of the vertical boundary portion is exposed to the cabin side.

Moreover, in the above-described embodiments and example modifications, the shape of the horizontal wall portion 42A of the airbag door 42 is a substantially rectangular shape whose lengthwise direction lies along the vehicle upward and downward direction as seen in a vehicle front view, but the technology of the present disclosure is not limited to this and the horizontal wall portion 42A may also be formed in another shape. For example, the horizontal wall portion 42A may also be formed so as to have a shape where the vertical boundary portion slopes in the vehicle rightward direction or the vehicle leftward direction heading from the vehicle upper side toward the vehicle lower side.

Moreover, in the second embodiment, the rear seat side-airbag device 80 is given a configuration where the inside guide portion 82 is disposed on the side garnish 20 and the outside guide portion 84 is disposed on the airbag door 42, but the rear seat side-airbag device 80 of the second embodiment is not limited to this. For example, the rear seat side-airbag device 80 may also be given a configuration equipped with only one of the inside guide portion 82 and the outside guide portion 84. Furthermore, the shapes of the inside guide portion 82 and the outside guide portion 84 are also not limited. For example, the vehicle upward and downward direction lengths of the inside guide portion 82 and the outside guide portion 84 may also be longer than they are in FIG. 6. Moreover, the rear seat side-airbag device 80 may also be given a structure where the inside guide portion 82 is formed separately from the side garnish 20 and secured to the side garnish 20. Furthermore, the rear seat side-airbag device 80 may be given a structure where the outside guide portion 84 is formed separately from the airbag door 42 and secured to the airbag door 42.

What is claimed is:

1. A rear seat side-airbag device comprising:
a side airbag that is disposed between a side garnish and a vehicle body, the side garnish being disposed at a vehicle width direction outer-side of a seat back of a rear seat, the side airbag becoming deployed on a side of an occupant; and
an airbag door garnish that includes a tear portion, the airbag door garnish covers the side airbag from a cabin side and is disposed at a position where at least part of a boundary section between the airbag door garnish and the side garnish is covered from the cabin side by webbing in an unworn state, the tear portion is spaced apart from the boundary portion and the tear portion is disposed at the vehicle width direction outer-side of the boundary portion.

2. The rear seat side-airbag device according to claim 1, wherein:
the boundary section includes a vertical boundary portion that extends in a vehicle upward and downward direction, and
an entire area of the vertical boundary portion is covered from the cabin side by the webbing in an unworn state.

3. The rear seat side-airbag device according to claim 2, wherein:

the boundary section includes a horizontal boundary portion that extends outward in the vehicle width direction from a lower end portion of the vertical boundary portion, and
at least part of the horizontal boundary portion overlaps with an arm rest of a rear side door as seen in a vehicle front view.

4. The rear seat side-airbag device according to claim 1, further comprising an inside guide portion that bulges out toward the cabin side from the side garnish and limits movement, inward in the vehicle width direction, of the webbing in an unworn state.

5. The rear seat side-airbag device according to claim 1, further comprising an outside guide portion that bulges out toward the cabin side from the airbag door garnish and limits movement, outward in the vehicle width direction, of the webbing in an unworn state.

6. The rear seat side-airbag device according to claim 1, wherein:
the side garnish is disposed on one side of the side airbag and the vehicle body is disposed on the other side of the side airbag.

7. The rear seat side-airbag device according to claim 1, wherein:
the airbag door garnish includes a hinge portion disposed at the vehicle width direction outer-side of the tear portion.

8. The rear seat side-airbag device according to claim 1, wherein:
the airbag door garnish includes an outer surface on the cabin side,
the side garnish includes an outer surface on the cabin side, and
in a state in which the airbag door garnish is attached to the side garnish, the outer surface of the airbag door garnish and the outer surface of the side garnish is the same surface at the boundary section.

9. The rear seat side-airbag device according to claim 8, wherein:
in a state in which the airbag door garnish is attached to the side garnish and the side airbag is deployed, the outer surface of the airbag door garnish and the outer surface of the side garnish is the same surface at the boundary section.

10. A rear seat side-airbag device comprising:
a side airbag that is disposed between a side garnish and a vehicle body, the side garnish being disposed at a vehicle width direction outer-side of a seat back of a rear seat, the side airbag becoming deployed on a side of an occupant; and
an airbag door garnish that includes a tear portion, the airbag door garnish covers the side airbag from a cabin side, the airbag door garnish including a horizontal wall portion that is exposed to the cabin side and extends in the vehicle width direction between the vehicle body and an outer end portion of the side garnish, the horizontal wall portion forming a same surface along with the outer end portion of the side garnish, and the airbag door garnish being disposed at a position where at least part of a boundary section between the horizontal wall portion of the airbag door garnish and the side garnish is covered from the cabin side by webbing in an unworn state, the tear portion is disposed at the vehicle width direction outer-side of the boundary portion.

11. The rear seat side-airbag device according to claim 10, wherein:

the boundary section includes a vertical boundary portion that extends in a vehicle upward and downward direction, and an entire area of the vertical boundary portion is covered from the cabin side by the webbing in an unworn state.

12. The rear seat side-airbag device according to claim 11, wherein:

the boundary section includes a horizontal boundary portion that extends outward in the vehicle width direction from a lower end portion of the vertical boundary portion, and at least part of the horizontal boundary portion overlaps with an arm rest of a rear side door as seen in a vehicle front view.

13. The rear seat side-airbag device according to claim 10, further comprising an inside guide portion that bulges out toward the cabin side from the side garnish and limits movement, inward in the vehicle width direction, of the webbing in an unworn state.

14. The rear seat side-airbag device according to claim 10, further comprising an outside guide portion that bulges out toward the cabin side from the airbag door garnish and limits movement, outward in the vehicle width direction, of the webbing in an unworn state.

15. The rear seat side-airbag device according to claim 10, wherein:

the side garnish is disposed on one side of the side airbag and the vehicle body is disposed on the other side of the side airbag.

16. The rear seat side-airbag device according to claim 10, wherein:

the airbag door garnish includes a hinge portion disposed at the vehicle width direction outer-side of the tear portion.

17. The rear seat side-airbag device according to claim 10, wherein:

the airbag door garnish includes an outer surface on the cabin side, the side garnish includes an outer surface on the cabin side, and in a state in which the airbag door garnish is attached to the side garnish, the outer surface of the airbag door garnish and the outer surface of the side garnish is the same surface at the boundary section.

18. The rear seat side-airbag device according to claim 17, wherein:

in a state in which the airbag door garnish is attached to the side garnish and the side airbag is deployed, the outer surface of the airbag door garnish and the outer surface of the side garnish is the same surface at the boundary section.

* * * * *